US011175931B2

(12) United States Patent
Coble et al.

(10) Patent No.: US 11,175,931 B2
(45) Date of Patent: Nov. 16, 2021

(54) AUTOMATED GRAPHICAL USER INTERFACE CONFIGURATION

(71) Applicant: AVEVA Software, LLC, Lake Forest, CA (US)

(72) Inventors: Robert Christopher Coble, Ladera Ranch, CA (US); Steven Michael Weinrich, York, PA (US); Julius Robert Kambach, Foothill Ranch, CA (US); John Joseph Krajewski, III, Rancho Santa Margarita, CA (US); Manoranjan Kumar Singh, Foothill Ranch, CA (US); Dave Tran, Rancho Santa Margarita, CA (US); Raju Uthu Kumar, Rancho Santa Margarita, CA (US); Douglas Paul Kane, Vashon, WA (US)

(73) Assignee: AVEVA SOFTWARE, LLC, Lake Forest, CA (US)

( * ) Notice: Subject to any disclaimer, the term of this patent is extended or adjusted under 35 U.S.C. 154(b) by 77 days.

(21) Appl. No.: 16/726,758

(22) Filed: Dec. 24, 2019

(65) Prior Publication Data
US 2020/0133473 A1 Apr. 30, 2020

Related U.S. Application Data

(63) Continuation of application No. 15/437,267, filed on Feb. 20, 2017, now abandoned.
(Continued)

(51) Int. Cl.
*G06F 9/451* (2018.01)
*G06F 8/38* (2018.01)
*G06F 3/0484* (2013.01)

(52) U.S. Cl.
CPC .......... *G06F 9/451* (2018.02); *G06F 3/04842* (2013.01); *G06F 3/04847* (2013.01); *G06F 8/38* (2013.01)

(58) Field of Classification Search
None
See application file for complete search history.

(56) References Cited

U.S. PATENT DOCUMENTS 6,023,714 A * 2/2000 Hill ....................... G06F 40/103
715/235
7,191,410 B1 * 3/2007 Kruempelmann .. G06F 16/9038
715/853
(Continued)

FOREIGN PATENT DOCUMENTS

WO 01/65322 A1 9/2001
WO 2014/151574 A1 9/2014

OTHER PUBLICATIONS

J. Abello, F. van Ham and N. Krishnan, "ASK-GraphView: A Large Scale Graph Visualization System," in IEEE Transactions on Visualization and Computer Graphics, vol. 12, No. 5, pp. 669-676, Sep.-Oct. 2006, doi: 10.1109/TVCG.2006.120. (Year: 2006).*
(Continued)

*Primary Examiner* — William L Bashore
*Assistant Examiner* — Nathan K Shrewsbury
(74) *Attorney, Agent, or Firm* — Greenberg Traurig, LLP

(57) ABSTRACT

Automated configuration of graphical user interface screens of industrial software applications. An application executing on a computing device utilizes a navigation model representing hierarchies of navigation items to automate placement of graphical components in appropriate locations on the graphical user interface.

20 Claims, 12 Drawing Sheets

Related U.S. Application Data

(60) Provisional application No. 62/325,670, filed on Apr. 21, 2016.

(56) References Cited

U.S. PATENT DOCUMENTS

| | | | | |
|---|---|---|---|---|
| 7,360,202 | B1* | 4/2008 | Seshadri | H04L 12/1859 717/106 |
| 7,702,487 | B2* | 4/2010 | Sherrill | G05B 23/0267 702/188 |
| 7,900,154 | B2* | 3/2011 | Savage | G06F 3/0481 715/765 |
| 7,953,767 | B2* | 5/2011 | Shaburov | G06F 8/34 707/805 |
| 8,296,665 | B2* | 10/2012 | Stienhans | G06F 8/38 715/763 |
| 8,312,382 | B2* | 11/2012 | Gilboa | G06F 8/38 715/763 |
| 8,386,809 | B2 | 2/2013 | Spitaels et al. | |
| 8,533,619 | B2 | 9/2013 | Baier et al. | |
| 8,572,220 | B2 | 10/2013 | O'Leary et al. | |
| 8,677,260 | B1* | 3/2014 | O'Riordan | G06F 9/451 715/765 |
| 8,677,262 | B2 | 3/2014 | Baier et al. | |
| 8,732,602 | B2 | 5/2014 | Deokar et al. | |
| 9,417,626 | B2* | 8/2016 | Jones | G05B 19/41865 |
| 9,513,763 | B1 | 12/2016 | Adams | |
| 9,558,047 | B1* | 1/2017 | Joyce | H04W 4/024 |
| 9,575,617 | B1* | 2/2017 | Joyce | G06F 16/9566 |
| 9,645,707 | B1* | 5/2017 | Joyce | G06F 16/958 |
| 9,773,264 | B2* | 9/2017 | Brown | G06Q 30/0601 |
| 9,791,908 | B2 | 10/2017 | Grehan et al. | |
| 9,829,881 | B2 | 11/2017 | Resnick et al. | |
| 9,886,175 | B1* | 2/2018 | Cox | G06F 8/38 |
| 10,346,184 | B2* | 7/2019 | Jann | G06F 8/38 |
| 2003/0028269 | A1 | 2/2003 | Spriggs et al. | |
| 2004/0003402 | A1* | 1/2004 | McKenna, Jr. | H04N 21/4438 725/46 |
| 2004/0128002 | A1 | 7/2004 | Frampton et al. | |
| 2005/0027377 | A1 | 2/2005 | Lucas et al. | |
| 2005/0120288 | A1 | 6/2005 | Boehme et al. | |
| 2005/0257190 | A1* | 11/2005 | Shaburov | G06F 8/38 717/106 |
| 2005/0257198 | A1* | 11/2005 | Stienhans | G06F 11/3672 717/124 |
| 2005/0257210 | A1* | 11/2005 | Stienhans | G06F 8/65 717/170 |
| 2005/0268232 | A1* | 12/2005 | Stienhans | G06F 8/38 715/700 |
| 2006/0074942 | A1* | 4/2006 | Shaburov | G06F 16/217 |
| 2006/0074967 | A1* | 4/2006 | Shaburov | G06F 16/2428 |
| 2006/0107218 | A1* | 5/2006 | Clark | G06F 3/0481 715/733 |
| 2007/0179641 | A1 | 8/2007 | Lucas et al. | |
| 2007/0239291 | A1 | 10/2007 | Wayland et al. | |
| 2008/0077512 | A1 | 3/2008 | Grewal | |
| 2008/0125877 | A1 | 5/2008 | Miller et al. | |
| 2008/0141179 | A1* | 6/2008 | Wulfe | G06F 9/451 715/854 |
| 2009/0094549 | A1 | 4/2009 | Adams | |
| 2009/0228838 | A1* | 9/2009 | Ryan | G06F 8/38 715/853 |
| 2009/0254801 | A1* | 10/2009 | Pressman | G06F 8/10 715/205 |
| 2009/0293005 | A1* | 11/2009 | Hooyman | G06F 8/38 715/762 |
| 2011/0138319 | A1* | 6/2011 | Sidman | G06F 3/04842 715/781 |
| 2011/0179390 | A1* | 7/2011 | Morris | G06F 3/0482 715/854 |
| 2011/0238691 | A1* | 9/2011 | Gere | H04L 41/0856 707/769 |
| 2012/0029661 | A1 | 2/2012 | Jones et al. | |
| 2012/0054603 | A1* | 3/2012 | Demant | G06F 3/0485 715/247 |
| 2012/0310381 | A1 | 12/2012 | Karaffa et al. | |
| 2013/0311915 | A1* | 11/2013 | Suzuki | G06F 8/38 715/763 |
| 2014/0258894 | A1* | 9/2014 | Brown | G06F 8/71 715/762 |
| 2014/0258968 | A1* | 9/2014 | Brown | G06F 40/166 717/103 |
| 2014/0277597 | A1 | 9/2014 | Le Sant et al. | |
| 2014/0282195 | A1 | 9/2014 | Nixon et al. | |
| 2015/0072663 | A1* | 3/2015 | Chande | H04M 1/72457 455/414.1 |
| 2015/0193418 | A1 | 7/2015 | Koska et al. | |
| 2015/0277741 | A1* | 10/2015 | Morse | G06F 3/0482 715/786 |
| 2016/0054988 | A1 | 2/2016 | Desire | |
| 2017/0308278 | A1* | 10/2017 | Coble | G06F 8/38 |
| 2017/0322782 | A1* | 11/2017 | Pakiman | G06F 8/34 |
| 2019/0129575 | A1* | 5/2019 | Wang | G06F 9/461 |
| 2019/0391825 | A1* | 12/2019 | Jann | G06F 3/0482 |
| 2020/0351382 | A1* | 11/2020 | Currier | H04L 67/16 |

OTHER PUBLICATIONS

M. -. D. Storey, K. Wong, F. D. Fracchia and H. A. Muller, "On integrating visualization techniques for effective software exploration," Proceedings of VIZ'97: Visualization Conference, 1997, pp. 38-45, doi: 10.1109/INFVIS.1997.6367 (Year: 1997).*

* cited by examiner

AUTOMATED GRAPHICAL USER INTERFACE CONFIGURATION

CROSS-REFERENCE TO RELATED APPLICATION

This application is a continuation of U.S. application Ser. No. 15/437,267, filed Feb. 20, 2017, entitled "Automated Graphical User Interface Configuration", which claims the benefit of and priority to U.S. Provisional Application No. 62/325,670, filed Apr. 21, 2016, entitled "Natural and Automated HMI Configuration", all of which are hereby incorporated by reference for all purposes.

TECHNICAL FIELD

Aspects of the present disclosure generally relate to development, configuration, and/or execution of processor-executable applications that monitor and/or control components in industrial processes. More particularly, aspects relate to systems and methods for automatically generating graphical user interfaces for use in industrial software design, management, and/or execution.

BACKGROUND

Typical industrial processes are extremely complex and receive substantially greater volumes of information than any human could possibly digest in its raw form. By way of example, it is not unheard of to have thousands of sensors and control elements (e.g., valve actuators) monitoring/controlling aspects of a multi-stage process within an industrial plant. These sensors are of varied type and report on varied characteristics of the process. Their outputs are similarly varied in the meaning of their measurements, in the amount of data sent for each measurement, and in the frequency of their measurements. As regards the latter, for accuracy and to enable quick response, some of these sensors/control elements take one or more measurements every second. Multiplying a single sensor/control element by thousands of sensors/control elements (a typical industrial control environment) results in an overwhelming volume of data flowing into the manufacturing information and process control system. Sophisticated data management and process visualization techniques have been developed to handle the large volumes of data generated by such system.

Highly advanced human-machine interface/process visualization systems exist today that are linked to data sources such as the above-described sensors and controllers. Such systems acquire and digest (e.g., filter) the process data described above. The digested process data in-turn drives a graphical display rendered by a human machine interface (HMI). Examples of such systems are the well-known Wonderware INTOUCH™ HMI software system for visualizing and controlling a wide variety of industrial processes and the ArchestrA™ (e.g., the application server or App-Server for INTOUCH™) comprehensive automation and information software open architecture designed to integrate and extend the life of legacy systems by leveraging the latest, open industry standards and software technologies.

Control system development/configuration environments allow for the configuration, development, and deployment of applications to runtime environments on control components in industrial processes. For example, Wonderware System Platform, available from Schneider Electric, provides various services including visualization, configuration, deployment, communication, security, data connectivity, data storage and management, people collaboration, and the like.

Known control system development/configuration environments require manual customization and scripting (e.g., coding) to support navigation through graphical components of an HMI application, layout of graphical components, and management of multiple display screens. Unfortunately, manually configuring HMI applications can be very complex and difficult.

SUMMARY

Aspects of the disclosure leverage navigation models (e.g., an asset hierarchy) to enable automatic navigation through graphical user interface screens of an HMI application, placement of graphical components on each screen, and/or management of screens across multiple display devices.

In an aspect, an automated graphical user interface system includes at least one configuration processor and processor-executable instructions stored on a computer-readable storage medium. When executed by the processor, the instructions display a navigation model that includes a hierarchy of navigation items. The instructions, when executed, receive a selection of one of the navigation item via an input device. The instructions, when executed, traverse the navigation model in response to receiving the selection to locate other navigation items that have metadata associated with the selected navigation item. The instructions, when executed, generate a graphical user interface screen that has a plurality of panes in response to locating the other navigation items. And the instructions, when executed in response to generating the graphical user interface screen, automatically populate at least one of the panes with visual content representing the selected navigation item and at least one of the remaining panes with visual content representing each of the located navigation items.

In another aspect, a computing device implements a method of automatically configuring graphical user interface screens. An application executing on the computing device displays a navigation model that includes a hierarchy of navigation items. The executing application receives a selection of one of the navigation items from an input device. The executing application traverses the navigation model to locate other navigation items that have metadata associated with the selected navigation item. In response to locating the other navigation items, the executing application generates a graphical user interface screen having a plurality of panes and populates at least one of the panes with visual content representing the selected navigation item and the remaining panes with visual content representing each of the other located navigation items automatically in response to generating the graphical user interface screen.

In yet another aspect, a computer readable storage device stores processor readable instructions that, when executed by a processor, implement a method of automatically configuring graphical user interface screens. The method includes displaying a navigation model that includes navigation items arranged hierarchically. The method further includes receiving a selection of one of the navigation items from an input device. The executing instructions traverse the navigation model to locate other navigation items that have metadata associated with the selected navigation item. In response to locating the other navigation items, the executing instructions generate a graphical user interface screen having a plurality of panes and populates at least one of the panes with visual content representing the selected navigation item and the remaining panes with visual content representing each of the other located navigation items automatically in response to generating the graphical user interface screen.

Other objects and features will be in part apparent and in part pointed out hereinafter.

BRIEF DESCRIPTION OF THE DRAWINGS

Corresponding reference characters indicate corresponding parts throughout the drawings.

DETAILED DESCRIPTION

Aspects of the disclosure are described herein in terms of Human Machine Interfaces (HMI), Supervisory Control and Data Acquisition (SCADA), and/or process automation. One having ordinary skill in the art will understand that the described concepts are not limited to these environments and may apply generally to dynamically composing any runtime graphical user interface by looking for available visual content to display, with that visual content organized in a hierarchy and tagged with metadata.

Figure 1:
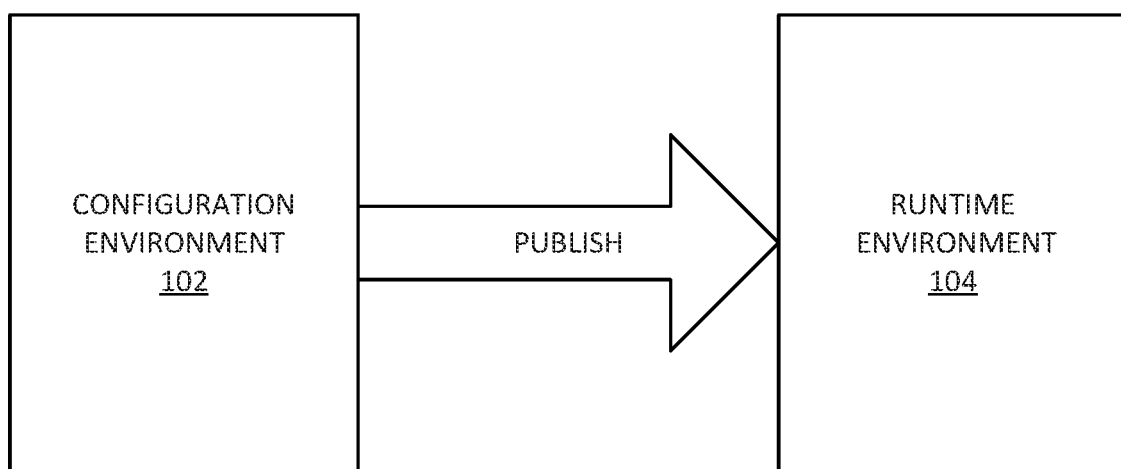
FIG. 1 is a block diagram illustrating exemplary automated generation of graphical user interface components according to an embodiment.

FIG. 1 illustrates an exemplary generation of graphical user interface components in accordance with an embodiment of the disclosure. Aspects of the disclosure enable automatic navigation through graphical user interface screens of an application based on an asset hierarchy and/or custom hierarchy, placement of graphical components (e.g., visual elements) with a predefined layout format based on the navigation model and metadata information defined on the graphical components, and automatically generate graphical user interface screens to create a data-driven HMI application experience.

In an embodiment, a user develops a layout and/or a navigation model during design time in a configuration environment 102. For example, a user can create a layout container component that includes a navigation model within. As used herein, the term "navigation model" includes a hierarchy of navigation items built by a user in a configuration environment either from scratch or using an asset model as input. The navigation model drives the composition of the view of visual content during runtime. In addition, the term "layout" includes a definition of how a screen is divided into named panes (e.g., rectangular segments) with the expectation that certain visual content will be placed in certain panes based on a user configuration. The layout container component is responsible for saving and loading the layout and its underlying navigation model. When a user creates a layout, the configuration environment creates a navigation model with one navigation item (e.g., a root navigation item). As used herein, the term "navigation item" includes an individual navigation item that contains properties for visual representation of an asset (e.g., equipment such as valves, tanks, and the like) and actions (e.g., "Show content X in location Y") to execute when selected by a user in a configuration environment and/or a runtime environment. A navigation item may or may not have a context to an asset model. When a user drags and drops content onto a pane within the layout editor a ShowContentAction is created to show the dropped content on the pane. The ShowContentAction stores information regarding the pane, the layout, and/or the content within the pane. The layout information and navigation model may each be saved by serialization into a blob. As used herein, the term "custom actions" includes actions (e.g., "put content X in pane Y") created by dragging and dropping content from a toolbox-like area to a specific pane. These actions exist on custom navigation nodes that are manually created. Custom actions may also be referred to as "explicit actions" in one or more embodiments. As used herein, the term "implicit actions" includes actions and/or content that already exist in a hierarchy of content and the auto-fill algorithm is attempting to place the content in a pane that is a best match for the content. These actions exist on an included hierarchy of content (e.g., asset hierarchy, equipment hierarchy).

As illustrated, the navigation model (e.g., as .aaNav files) is published from the configuration environment 102 to the runtime environment 104 as part of a layout (e.g., as XML files) and/or as part of a view application (e.g., ViewApp).

In accordance with one or more embodiments, when the application is started in the runtime environment 104 the startup layouts are loaded and displayed on the configured screens. At that point, the navigation model that drives the visual content is hosted by a view application. In accordance with an aspect of the disclosure, a navigation model has at least two uses, depending on whether it is used with a layout or a view application. When the navigation model is used with a layout, the layout acts as a small widget of behavior with the expectation that the entire widget will be placed in a pane and used during runtime. When the navigation model is used with a view application (e.g., a ViewApp), the view application knows about which screen profile is being targeted, allowing the user to place layouts on screens and then compose the visual content across all of the screens.

Figure 2:
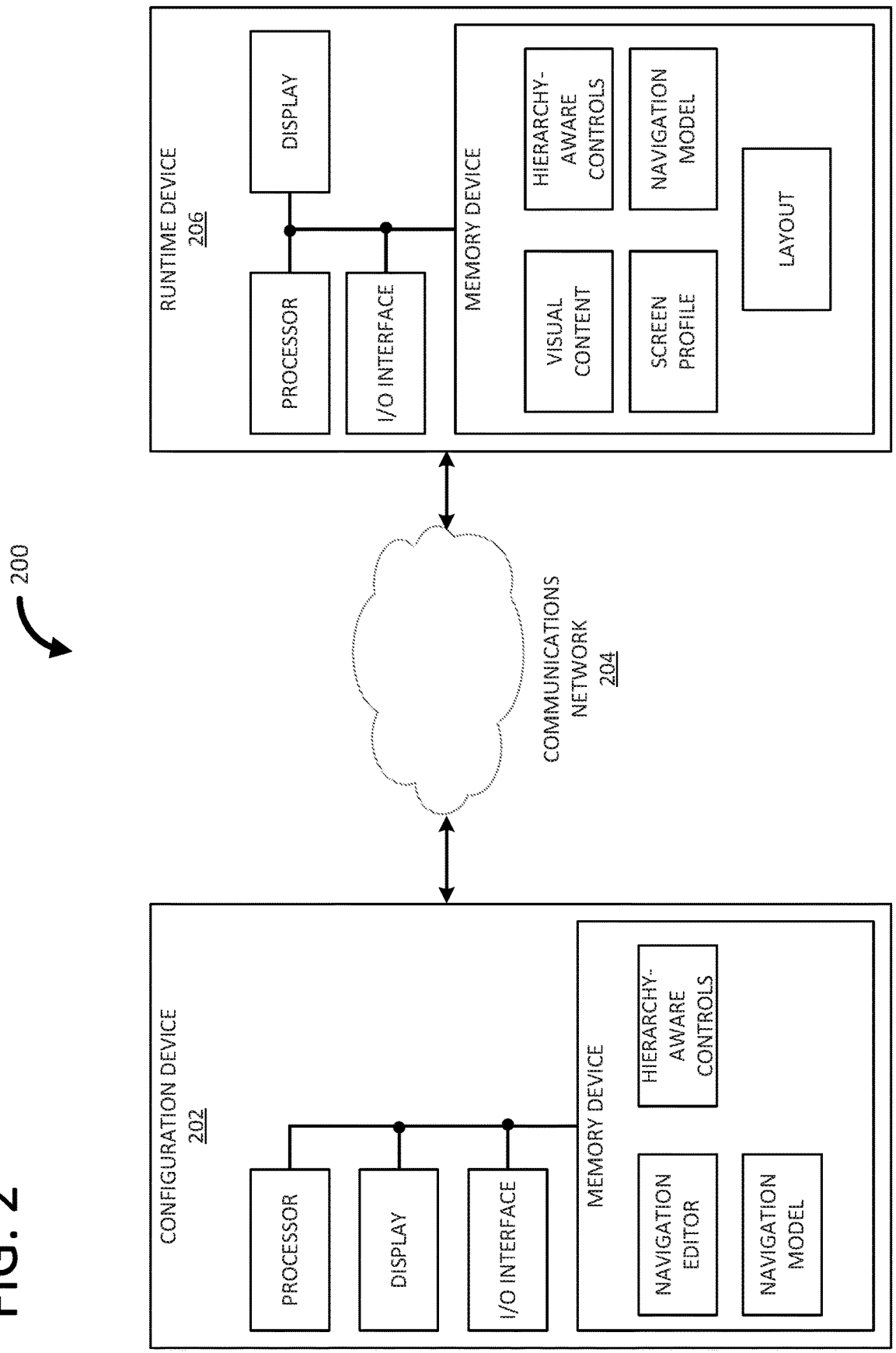
FIG. 2 is a block diagram illustrating a system that enables automated generation of the graphical user interface components of FIG. 1 according to an embodiment.

FIG. 2 illustrates a system, generally indicated at 200, within which an embodiment of the disclosure may be incorporated. The system 200 in the illustrated embodiment includes a configuration device 202, a communications network 204, and a runtime device 206.

The configuration device 202 includes at least one processor, a memory, a display, and an input/output (I/O) interface and is configured to provide the configuration environment 102 via a software environment. The memory of configuration device 202 includes a navigation editor, a navigation model, and hierarchy aware controls. As used herein, the term "navigation editor" includes an editor enabling a user to build a navigation model. And the navigation editor comprises a configuration environment (e.g., a ViewApp Editor, Layout Editor, etc.) in accordance with one or more embodiments. As used herein, the term "hierarchy aware control" includes a control configured in a configuration environment (e.g., design time) and utilized in a runtime environment that knows how to react to a hierarchy (i.e., a navigation model) and displays the requested hierarchy information as required. Exemplary hierarchy aware controls include a tree control, a menu control, a tile list, a tab control, and the like. For instance, trees and menus may show multiple levels of a navigation model while a list or tab control may display one level of the navigation model in accordance with one or more embodiments.

In this manner, configuration device 202 comprises a special-purpose computing device for automated graphical user interface configuration. The one or more processors, memory, display, and I/O interface are communicatively connected and/or electrical connected to each other. The configuration processor is adapted to execute processor-executable instructions stored in the memory for implementing the automated graphical user interface configuration system and method. In an embodiment, the I/O interface is a network interface card (NIC) or modem connecting configuration device 202 to communications network 204. Additionally or alternatively, the I/O interface is a human input device, such as a touchscreen, a mouse, a keyboard, or the like.

The communications network 204 is capable of facilitating the exchange of data among various components of system 200, including configuration device 202 and runtime device 206. The communications network 204 in the embodiment of FIG. 2 includes a wide area network (WAN) that is connectable to other telecommunications networks, including other WANs or portions of the Internet or an intranet, including local area networks (LANs). The communications network 204 may be any telecommunications network that facilitates the exchange of data, such as those that operate according to the IEEE 802.3 (e.g., Ethernet) and/or the IEEE 802.11 (e.g., Wi-Fi) protocols, for example. In another embodiment, communications network 204 is any medium that allows data to be physically transferred through serial or parallel communication channels (e.g., copper wire, optical fiber, computer bus, wireless communication channel, etc.). In an embodiment, communications network 204 comprises at least in part a process control network. In another embodiment, communications network 204 comprises at least in part a SCADA system. In yet another embodiment, communications network 204 comprises at least in part an enterprise manufacturing intelligence (EMI)/ operational intelligence (OI) system.

The runtime device 206 includes at least one processor, a memory, a display, and an I/O interface. The memory of runtime device 206 includes a graphic runtime module, visual content, a screen profile, hierarchy aware controls, a navigation model, and a layout. In an embodiment, the term "screen profile" includes a definition of how a set of screens are physically composed across display devices and the term "graphic runtime modules (GRM)" includes an engine by which HMI graphical components are rendered to a screen on a display device with real-time data values from process control devices. In this manner, runtime device 206 comprises a special-purpose computing device for automated graphical user interface configuration. The one or more processors, memory, display, and I/O interface are communicatively connected and/or electrical connected to each other. The processor is adapted to execute processor-executable instructions stored in the memory for implementing the automated graphical user interface configuration system and method. In an embodiment, the I/O interface is a network interface card (NIC) or modem connecting runtime device 206 to communications network 204. Additionally or alternatively, the I/O interface is a human input device, such as a touchscreen, a mouse, a keyboard, or the like.

Figure 3:
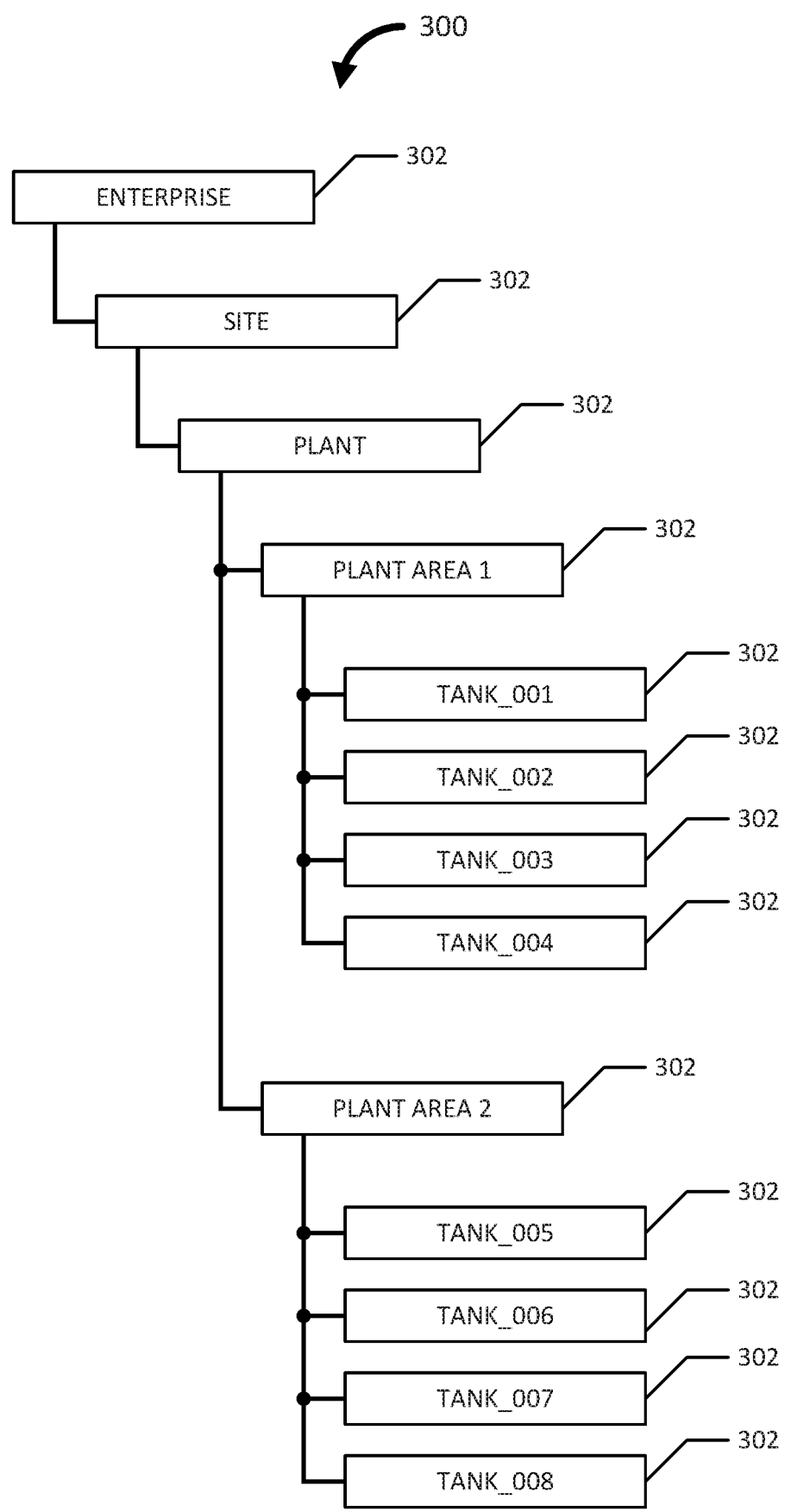
FIG. 3 is a block diagram illustrating an exemplary navigation model according to an embodiment.

FIG. 3 illustrates a navigation model, generally indicated at 300, in accordance with an embodiment. The navigation model 300 is comprised of navigation items 302. In configuration environment 102 (e.g., a ViewApp, Layout, etc.) navigation model 300 defines the navigation through display screens for an end-user (e.g., runtime) experience. Each navigation item 302 holds a configuration that allows the navigation item to express itself visually in several ways, ranging from simple text to complex visual content representations. Each navigation item 302 also holds properties to toggle visibility, checked state, and like properties. Each navigation item 302 is configured to hold one or more actions to execute when selected by a user.

In an embodiment, configuration environment 102 includes a single navigation model 300 that may be customized to meet user needs. The navigation model 300 may include multiple root nodes that serve as different visual representations of the application in a single navigation model. The navigation model 300 defines the navigation hierarchies, references to visual content utilized by navigation aware controls, and the actions to execute when selected. These behaviors are separated from the actual control which will present the navigation model 300 data to the user. This separation allows runtime environment 104 to visually express navigation model 300 in multiple ways at runtime. The power of this multiple expression behavior becomes more apparent when multiple hierarchy aware controls are used together to represent a single navigation model 300 to the user. In an embodiment, navigation model 300 is not an individual item in a project, but is part of one or more objects in the project. For example, navigation model 300 may be serialized with a layout object, serialized with a ViewApp object, and the like. The navigation model 300 travels with the import/export of the object with which it is serialized.

In runtime environment 104 all published navigation models 300 from configuration environment 102 (e.g., various layouts and the single ViewApp) reside within a published application folder. Navigation aware controls request specific navigation items 302 based on human readable path strings which are references into particular hierarchies of navigation model 300. The runtime environment 104 executes requests from the navigation aware controls to return results based on the request. In an embodiment, navigation aware controls are unaware of which specific navigation model 300 they are using, but rely on the path string that identifies the link into a particular navigation model's hierarchy. During runtime, a navigation model path string may be injected into a "NavigationModel" property of the control and the control must react accordingly based on the control's configuration. Examples of URI usage are further described herein.

Each individual navigation item 302 in navigation model 300 contains the necessary information to display a visual representation of an item in various forms, and one or more actions executed when a user triggers (e.g., selects via a GUI on a display device) the navigation item. In an embodiment, navigation items 302 are "all inclusive." In another embodiment, navigation items 302 include the ability to be all inclusive regardless of which type of hierarchy aware control is being used to represent the navigation item. The navigation item 302 does not need to support all visual representations possible.

The navigation items 302 may be organized (e.g., by a user) in configuration environment 102 in a single flat list or in a hierarchy to comprise navigation model 300. There is no difference between a navigation item that is a leaf node as compared to a navigation item that contains child navigation items. In other words, navigation items containing other navigation items can also trigger actions when selected and are not simply containers for navigation items.

In an embodiment, navigation items 302 have a context to the asset model. In this embodiment, a user can override default values of the asset model and tailor them for usage in navigation model 300 (e.g., override name "WSTIN-TANK_004" with "West InTake Tank 4"). In another embodiment, navigation items 302 have a context into a visual toolbox (GTB). In yet another embodiment, navigation items 302 are query related and evaluated at runtime. Exemplary query navigation items include a content most recently used (MRU) query that returns the last number of items viewed by the user and a query to return all specific content types for assets in alarm. As used herein, the term "content type" includes a defined value in a project that acts as a tag to define the nature and usage of a particular visual content component (e.g., an asset) in the project and the term "content types" includes a list of content types available to a user for tagging content (e.g., metadata to describe content in the project). And the term "visual content" as used herein includes a graphical (i.e., visual) widget that may be displayed on a screen by a display device. Exemplary graphical widgets include HMI graphical components, Windows Presentation Foundation (WPF) controls, a WinForms control, a web snippet, a document, and the like.

Referring further to the embodiment of FIG. 3, navigation items 302 include an auto-fill behavior. In this embodiment, each navigation item 302 controls whether available panes on currently displayed layouts should be auto-filled. Before an auto-fill algorithm (described further herein) can execute, the appropriate layouts must be applied to the available screens. The layouts are determined by looking at the current navigation item 302 to determine if there are any specific layouts that should be applied to the screens. If any screens are still empty without layouts, the parent navigation item 302 is queried to continue to search for layouts appropriate for screens. This process continues until the root node of the navigation hierarchy is reached, or all screens have layouts. In an embodiment, it is possible for a user to explicitly mark a screen as empty without a layout in configuration environment 102 (e.g., design time). In this embodiment the layout on the screen is closed. Once the appropriate layouts are determined, the auto-fill algorithm executes against the available layouts.

Auto-filling includes one or more options to control how content is automatically injected into panes without the user having to individually configure the view. In a "none" mode, no content is automatically displayed unless specific commands have been created to display content. In the "none" mode the user has to manually assign the content to specific panes via drag/drop operations. Any commands in parent navigation items or child navigation items are not considered to be used to fill in screens or panes. The "none" mode is available on custom navigation items 302. In a "fill from current" mode, the user assigns layouts to screens, but any content on the selected navigation item 302 would automatically be filled into the available panes using a best available pane algorithm.

In a "fill from current and look up" mode, for example, the auto-fill algorithm looks for layouts that initially fill the screens prior to determining which content should be displayed in particular panes. The current navigation item 302 is inspected for any commands that place layouts or contents in a full screen. For any screens that are still empty, the auto-fill algorithm looks up to the parent navigation item 302 for additional ShowLayout or ShowScreen commands to apply to the empty screens. Once the contents have been established on screens, any content residing on the current navigation item 302 is displayed on the screen using a best available pane algorithm for each individual piece of content. For any panes that are still empty, the auto-fill algorithm looks up to the parent navigation item 302 for additional commands/content to apply to the empty panes. This process continues until all panes are filled or the root of navigation model 300 is reached. If the auto-fill pane algorithm intends to replace pane content with exactly the same content it already has, that command is skipped so the existing content is not disturbed. In an embodiment, some panes are not filled and are made empty.

A "fill from current and look up then down" mode can be configured as identical to the "fill from current and look up" mode with one addition. If the auto-fill pane algorithm has reached the root of navigation model 300 and there are still empty screens/panes, the first child of the current navigation item 302 is inspected to see if it has content that applies to the available screens/panes. This process continues down the navigation model 300 using the first child at each level until a leaf node is hit, then the auto-fill algorithm stops. In an embodiment, the "fill from current and look up then down" mode is a default mode.

The auto-fill algorithm makes no distinction between explicit or implicit commands on any navigation item 302 when deciding whether to use the content of the action to place in a pane. This lack of distinction also holds true for when the auto-fill algorithm is looking upward or downward in the navigation model 300. Explicit actions are triggered by the presence of a pane name on a screen for placement. Regardless of what layout is actually on the screen, the auto-fill algorithm will use an explicit action on any level of the navigation model 300 if the pane name specified in the action is present on the target screen and the pane is available to receive the content. A single navigation item may have multiple explicit actions targeted at a single pane along with other explicit actions at different levels of the navigation model 300 if the auto-fill mode is "fill from current and look up" or "fill from current and look up then down" and the explicit actions use the pane name. Implicit actions are triggered by an available pane that matches the content type of the content. A multi-content pane can be the destination of multiple implicit action calls while executing the auto-fill algorithm. For instance, if a pane is configured to host multiple contents and tagged to host overview type pieces of content, and there is a hierarchy of L1, L2, and L3 navigation items 302 with each navigation item having an overview type content, then the overview pane would display three pieces of content. In an embodiment with multi-content panes (e.g., a single pane filled with content from different levels in navigation model 300) the order of the content is dependent upon how it was filled with the auto-fill algorithm.

Content types enable a user to tag visual content for specific purposes. Exemplary content types include "Faceplate", "Overview", and the like. Content types enable a user to control where content of a particular type is displayed within runtime environment 104. In an embodiment, a user can tag content on assets with certain content types so they are automatically utilized when the asset model is utilized in navigation model 300.

At a high level, a hierarchy control (e.g., hierarchy aware control) reads and/or is injected with the navigation model it should display and displays a particular portion of navigation model 300 based on its configuration. A particular hierarchy aware control knows how many levels of the hierarchy (e.g., of navigation model 300) to display based on its configuration. For instance, a tree control has the ability to display multiple levels of navigation model 300 but a grid control may only be able to display a single level. For controls that can display multiple levels, one or more properties control how many levels it displays from navigation model 300. Moreover, each hierarchy aware control acts in a publish/subscribe ("pub/sub") model with other tightly coupled hierarchy aware controls to allow multiple controls to visualize a single navigation model 300. In an embodiment, only one navigation item 302 in the runtime navigation model 300 for a ViewApp is active at a time. The manner in which that single navigation item is selected can happen via various methodologies (e.g., mouse, keyboard, touchscreen, etc.).

Figure 4:
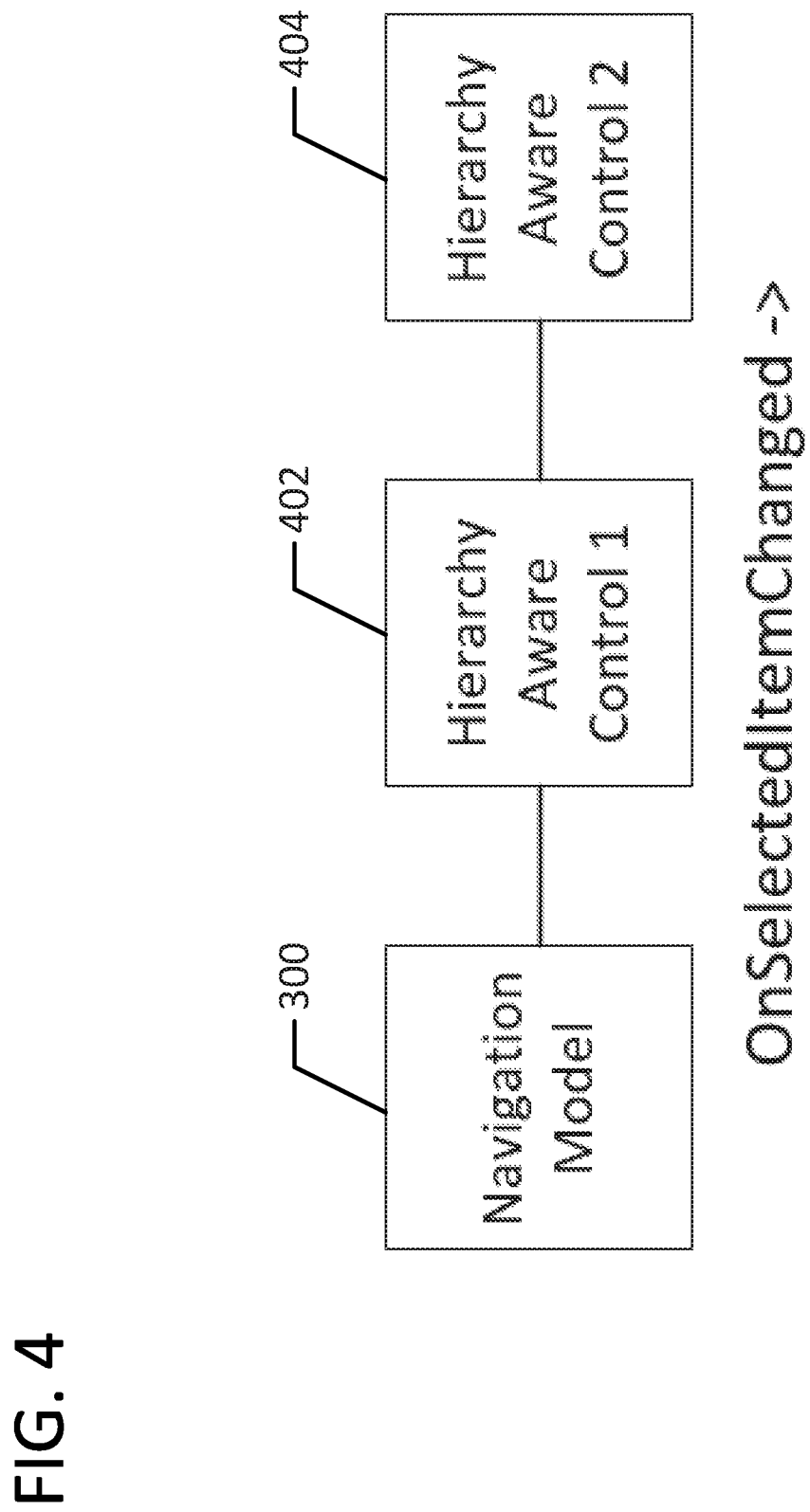
FIG. 4 is a block diagram illustrating linked hierarchy controls according to an embodiment.

In an embodiment, a user may link two or more hierarchy controls together to achieve advanced behaviors in runtime environment 104. Linking hierarchy controls enables multiple navigation controls to visually express a single navigation model 300 in multiple ways. Within configuration environment 102 (e.g., at design time) a user may point the navigation model 300 of one hierarchy aware control to an existing hierarchy aware control. FIG. 4 illustrates an exemplary embodiment of wiring together multiple navigation aware controls. When a currently selected navigation item 302 changes in one or more ways a navigation model service is notified. The navigation model service then looks at all subscribers to the service. The selection change is sent to the first subscriber of the navigation model 300, which in the illustrated embodiment is a first hierarchy aware control 402 (e.g., "HierarchyAwareControl1"). The first hierarchy aware control 402 is linked directly against a node in navigation model 300 and performs a linking process. The first hierarchy aware control 402 determines whether it holds the selected navigation item 302 itself, and if so, visually selects it. If there are any subscribers to the first hierarchy aware control 402 it publishes the new selected node at the current level. When the first hierarchy aware control 402 holds the selected navigation item 302 the current selection was changed and the downstream second hierarchy aware control 404 refreshes to reflect this new value. After refreshing the downstream hierarchy aware control by reading the children and populating the view the process begins again.

Referring further to FIG. 4, if the first hierarchy aware control 402 determines it is not holding the selected navigation item 302 itself the first hierarchy aware control 402 determines if it is holding a parent of the selected navigation item 302. If it is holding a parent of the selected navigation item 302 it visually selects the parent. If there are any subscribers to the first hierarchy aware control 402 it publishes the new selected node at the current level. If the first hierarchy aware control 402 determines it is holding neither the selected navigation item 302 nor a parent of the selected navigation item 302 the first hierarchy aware control 402 maintains the existing selection and takes no further action (e.g., does not forward the OnSelectedItemChanged to any subscribing controls).

Figure 5:
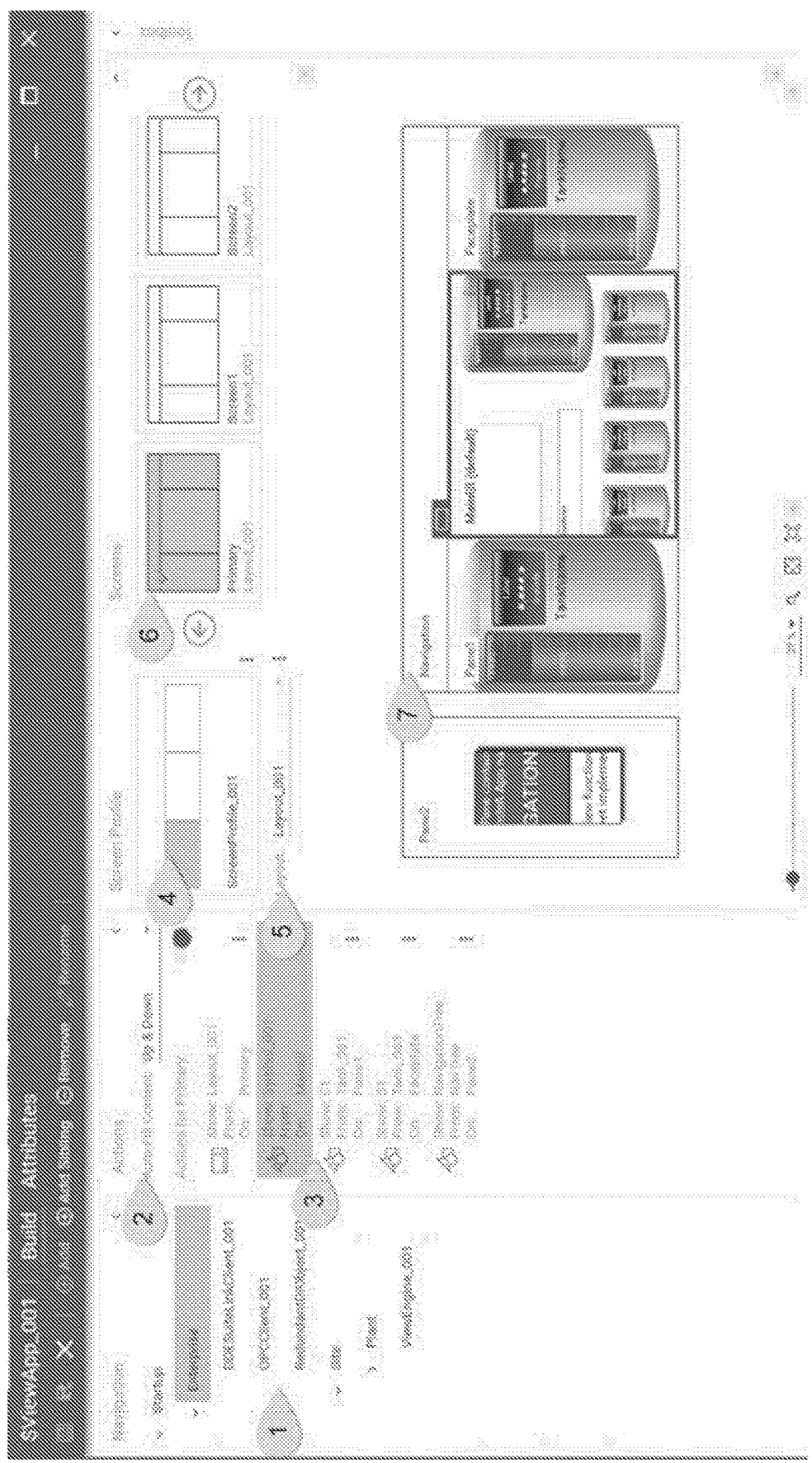
FIG. 5 is a screenshot illustrating an exemplary navigation editor according to an embodiment.

FIG. 5 illustrates an exemplary view application editor 500 GUI according to an embodiment. In an embodiment, the view application editor 500 includes a navigation model editor, which is an editor for creating and modifying navigation model 300. The editor 500 works in configuration environment 102 to present a "what you see is what you get" (WYSIWYG) experience to build the visual representation of what is displayed at each level in the navigation model 300. The view application editor 500 includes a representation 1 of navigation model 300 holding a hierarchy of navigation items 302, a representation 2 of auto-fill behavior specific to the selected navigation item 302, a list 3 of actions for showing which content will be placed in which pane, an overview 4 of screens that are part of the screen profile (e.g., ViewApp), a representation 5 of the current layout being used on the current screen, a representation 6 of which layouts are being utilized on which screens, and a WYSIWYG visual representation 7 of how the content is applied to the current screen using the current layout.

Figure 6:
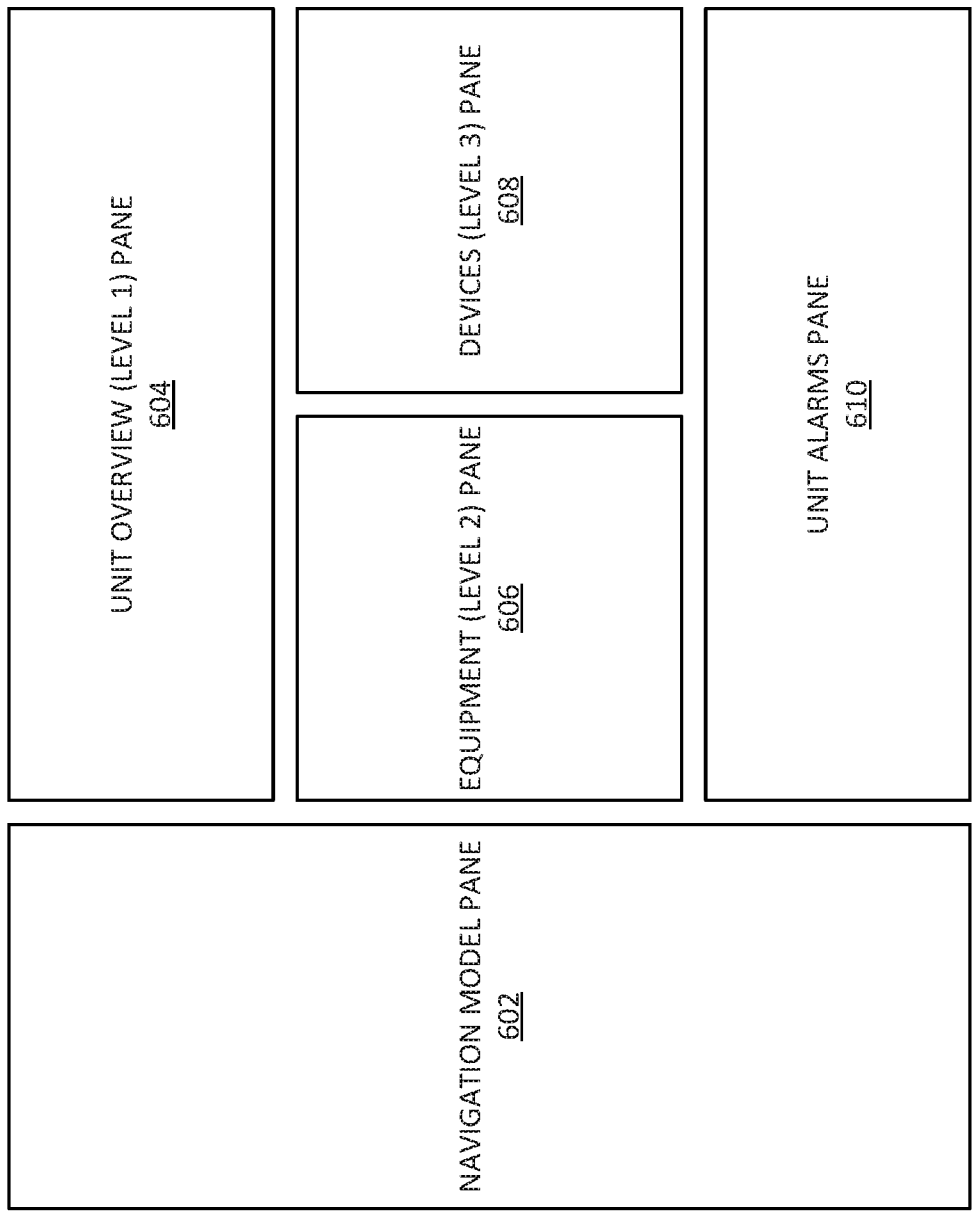
FIG. 6 is block diagram illustrating an exemplary graphical user interface screen layout according to an embodiment.

FIG. 6 illustrates an exemplary layout 600 of a graphical user interface screen of runtime environment 104 according to an embodiment. The layout 600 includes a navigation model pane 602, a unit overview pane 604, an equipment pane 606, a devices pane 608, and a unit alarms pane 610.

The view application editor 500 is a view composition engine that drives the final presentation of the layout 600 to the screen. To fully compose layout 600 actions from multiple levels of navigation model 300 are combined together to fill as many panes as possible based on the currently selected navigation item 302. This implies that what the user sees at any particular moment is a combination of content which is shown by the currently selected navigation item and other content shown by the parent nodes and first child nodes (e.g., when the auto-fill mode is "up and down") of the currently selected navigation item.

When a navigation item 302 triggers opening one or more pieces of content to panes, a process begins to fill the panes. All screens across the screen profile are considered empty. Layouts are determined across the available screens using inheritance. Thus, if the current level of the navigation model 300 specifies a layout for use on a screen then it is applied to that screen. If any screens are left empty the parent navigation item 302 is queried to determine if a layout is specified for that screen. All panes across all now-determined layouts are assumed to be empty while the composition engine determines what should be visible in each pane. The content is shown in the appropriate pane(s) given the pane type or a direct reference to the pane. Layouts that have pre-existing content coming from the layout would not be considered for a pane type match. Other panes that do not display content are enumerated to retrieve their individual types. For each pane type, the current level in the navigation model 300 is queried to see if any explicit actions exist that specify a pane name that exists in the destination screen and/or if any implicit actions exist based on content of that type. In an embodiment, this request is used for navigation items 302 when the navigation item has a context into the navigation model 300 because a navigation item 302 may have several different types of content on it (e.g., overview, faceplate, etc.). If any actions are found at that level of navigation model 300, they are displayed in the panes that were determined across the available screens using inheritance. For empty panes, the parent of the current navigation item 302 is retrieved and the search starts again, attempting to satisfy all the content types of the pane. The search ends when either all content is found for the panes or the root of navigation model 300 is reached. In an embodiment in which there are multiple panes with the same content type the pane is chosen based on the alphabetical order of the pane name.

Referring further to FIG. 6, navigation model pane 602 holds a tree control with the entire asset model of L1, L2, and L3 displays in an embodiment. The unit overview pane 604 includes an L1 display of primary graphic overviews. The equipment pane 606 includes an L2 display of groups of equipment graphics. The devices pane 608 includes an L3 display of faceplates for a specific device.

When a user selects a navigation item 302 in navigation model pane 602 on a screen of runtime device 206 that opens an L1 display then the L1 display is opened in unit overview pane 604. The runtime device 206 then looks for L2, L3 and embedded alarm control (EAC) content on the L1 navigation item. When runtime device 206 finds no L2, L3, or EAC content the process ends. When runtime device 206 finds L2, L3, and/or EAC content then the content is displayed in each corresponding pane.

When a user selects a navigation item 302 in navigation model pane 602 on a screen of runtime device 206 that opens an L2 display then the L2 display is opened in equipment pane 606. The runtime device 206 then looks for L1, L3, and EAC content on the L2 navigation item. When runtime device 206 finds L1, L3, and/or EAC content then the content is displayed in each corresponding pane. When runtime device 206 finds no L1, L3, or EAC content, runtime device 206 goes up a level from the L2 navigation item to the L1 navigation item and looks for L1, L3, and/or EAC content on the L1 navigation item. When runtime device 206 finds an L1 display the L1 display is displayed in unit overview pane 604.

When a user selects a navigation item 302 in navigation model pane 602 on a screen of runtime device 206 that opens an L3 display then the L3 display is opened in devices pane 608. When runtime device 206 finds L1, L2, and/or EAC content then the content is displayed in each corresponding pane. When runtime device 206 finds no L1, L2, or EAC content, runtime device 206 goes up a level from the L3 navigation item to the L2 navigation item and looks for L1, L2, and/or EAC content on the L2 navigation item. When runtime device 206 finds an L2 display the L2 display is displayed in equipment pane 606. The runtime device 206 then goes up a level from the L2 navigation item to the L1 navigation item and looks for L1 and/or EAC content on the L1 navigation item. When the runtime device 206 finds an L1 display the L1 display is displayed in unit overview pane 604.

A ViewApp follows the same pattern as the layout described above, but is at an abstraction level higher than the layout. At the layout level, the only visible places to place content are in panes 602-610. At the ViewApp level, the initial places to put content are based on the screen profile supported by the ViewApp. The ViewApp must first specify which layouts belong on which screen profiles. Commands executed after that would populate the panes 602-610 in each of the layouts.

When one of panes 602-610 has hierarchy navigation enabled, a user may swipe up to move to the previous navigation item 302 or swipe down to move to the next sibling navigation item 302. In an embodiment, panes 602-610 each include small indicators (e.g., arrows) at the top and bottom of the pane that accomplish the same behavior when selected (e.g., clicked). The top indicator holds the name of the previous navigation item 302 and the count of previous navigation items, and the bottom indicator holds the name of the next navigation item 302 and the count of next navigation items to aid the user. Selection of the up/down indicators triggers activation of a new navigation item 302. When a particular pane 602-610 has been populated with a piece of content, the pane will have to know which navigation item 302 caused that content to end up in the pane. For example, to process an up to down swipe the pane will need to determine from navigation model 300 the previous sibling navigation item 302 and the content that will end up in this pane to process the visual slide. In an embodiment, the up to down swipe will execute the navigation item in the same manner as a click (e.g., via a mouse) on a navigation aware control to trigger the same item. To know which visual content to slide in, the pane forwards a request for content based on the behaviors of the previous sibling navigation item 302 (i.e., asking the previous navigation item "what do you expect is in this pane when you are triggered?"). The result of the request is visually slid into the pane. Panes 602-610 in layout 600 may be filled in using the auto-fill algorithm described herein. In a single layout 600 the content displayed in panes 602-610 may come from different navigation items 302. Using hierarchy navigation in any pane 602-610 will utilize the specific navigation item 302 for swiping behavior which placed that original content in the pane.

When a particular pane 602-610 is set to a "multiple" mode and has been populated with multiple pieces of content, content navigation enables a user to move through the multiple pieces of content in the pane. In an embodiment, content navigation is accomplished by swiping left or right in the pane to move the previous sibling content and next sibling content, respectively. In another embodiment, the pane displays swipe indicators to allow users to see which swipes are available along with a count of the number of previous and/or next sibling contents as a reference. In an embodiment, panes 602-610 each include small indicators (e.g., arrows) at the left and right of the pane that accomplish the same behavior when selected (e.g., clicked). For instance, in a multi-content pane the left/right indicators move back and forth to visibly display one piece of content at a time. Selection of the left/right indicators cycles through the pieces of content rather than displaying and/or triggering any navigation items.

FIGS. 7A-7F illustrate the auto-fill algorithm in accordance with an embodiment. The algorithm determines how panes 602-610 will be filled when actions on a selected navigation item 302 are executed. In accordance with one or more embodiments, the algorithm considers factor such as the content type of contents and available panes 602-610, existing content on layout 600, and/or clearing of contents after execution of the algorithm. The algorithm enables the automatic filling of panes through navigation in both configuration environment 102 and runtime environment 104. In the exemplary embodiment described below, a processor of runtime device 206 executes processor-executable instructions stored in the memory to perform the auto-fill algorithm via runtime environment 104.

Figure 7A:
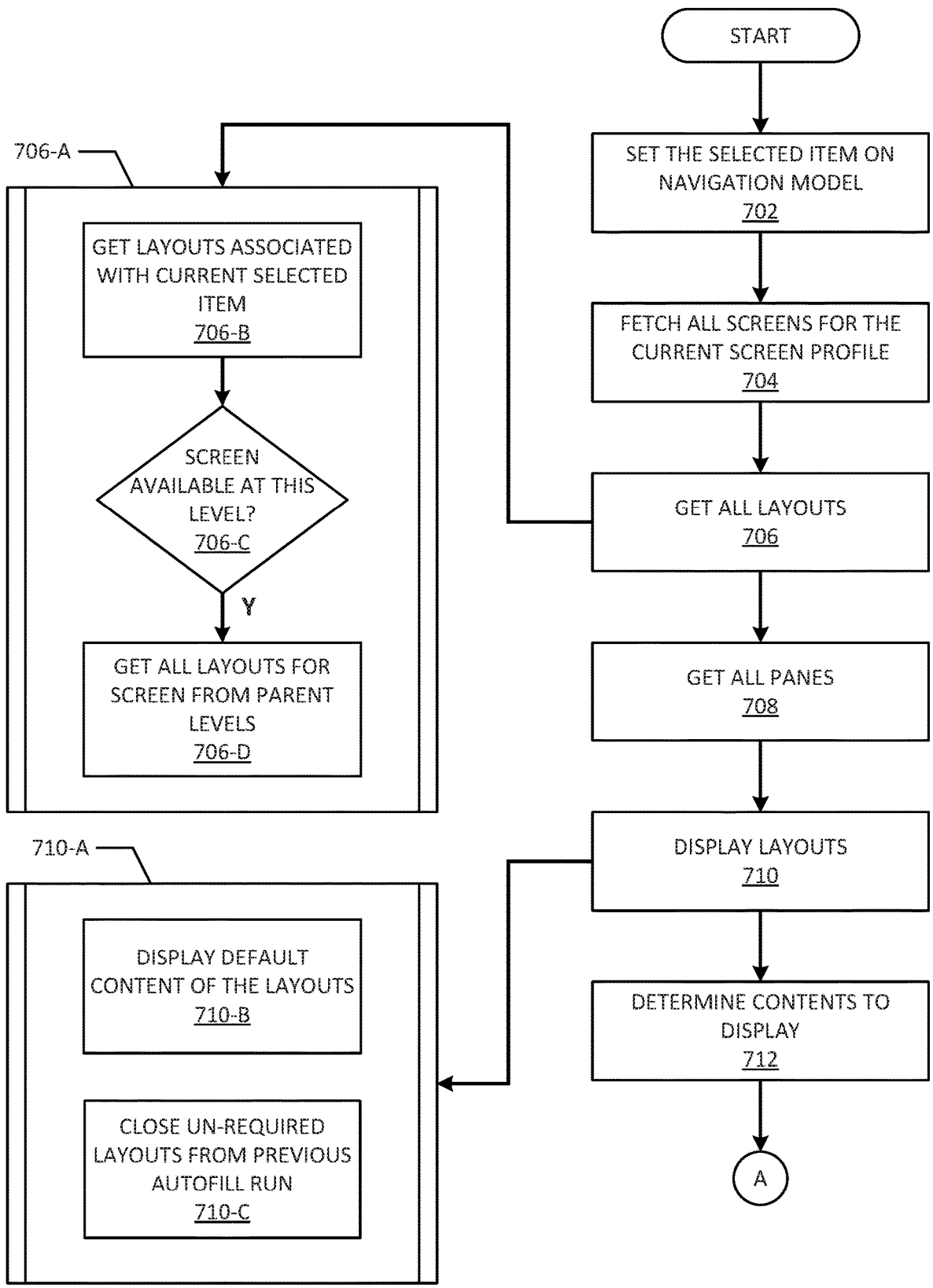
FIGS. 7A-7F illustrate an exemplary graphical component placement process according to an embodiment.

Referring to FIG. 7A, upon selection of a displayed navigation item 302 the auto-fill algorithm sets the selected navigation item 302 on the navigation model 300 at step 702. At step 704, the auto-fill algorithm fetches all screens for the current screen profile. The auto-fill algorithm then gets all layouts at step 706. In an embodiment, step 706 includes subprocess 706-A in which the auto-fill algorithm gets layouts associated with the currently selected navigation item 302 at step 706-B, determines whether a screen is available at the required level for the selected navigation item 302 at step 706-C, and gets all layouts for the available screen from parent navigation items of the currently selected navigation item within the navigation model 300 at step 706-D.

The auto-fill algorithm then gets all unlocked panes at step 708. In an embodiment, step 708 includes walking the screens and enumerating all of the panes. Generally, panes are unlocked but if content was placed in a pane at the layout level then it would be considered locked. In an embodiment in which a user has configured a pane to not participate in auto-fill that pane will also be considered locked.

At step 710, the auto-fill algorithm displays the layouts. In an embodiment, step 710 includes subprocess 710-A in which the default content of the layouts are displayed at step 710-B and/or un-required layouts from previous auto-fill executions are closed at step 710-C. The auto-fill algorithm then determines which contents to display at step 712.

Figure 7B:
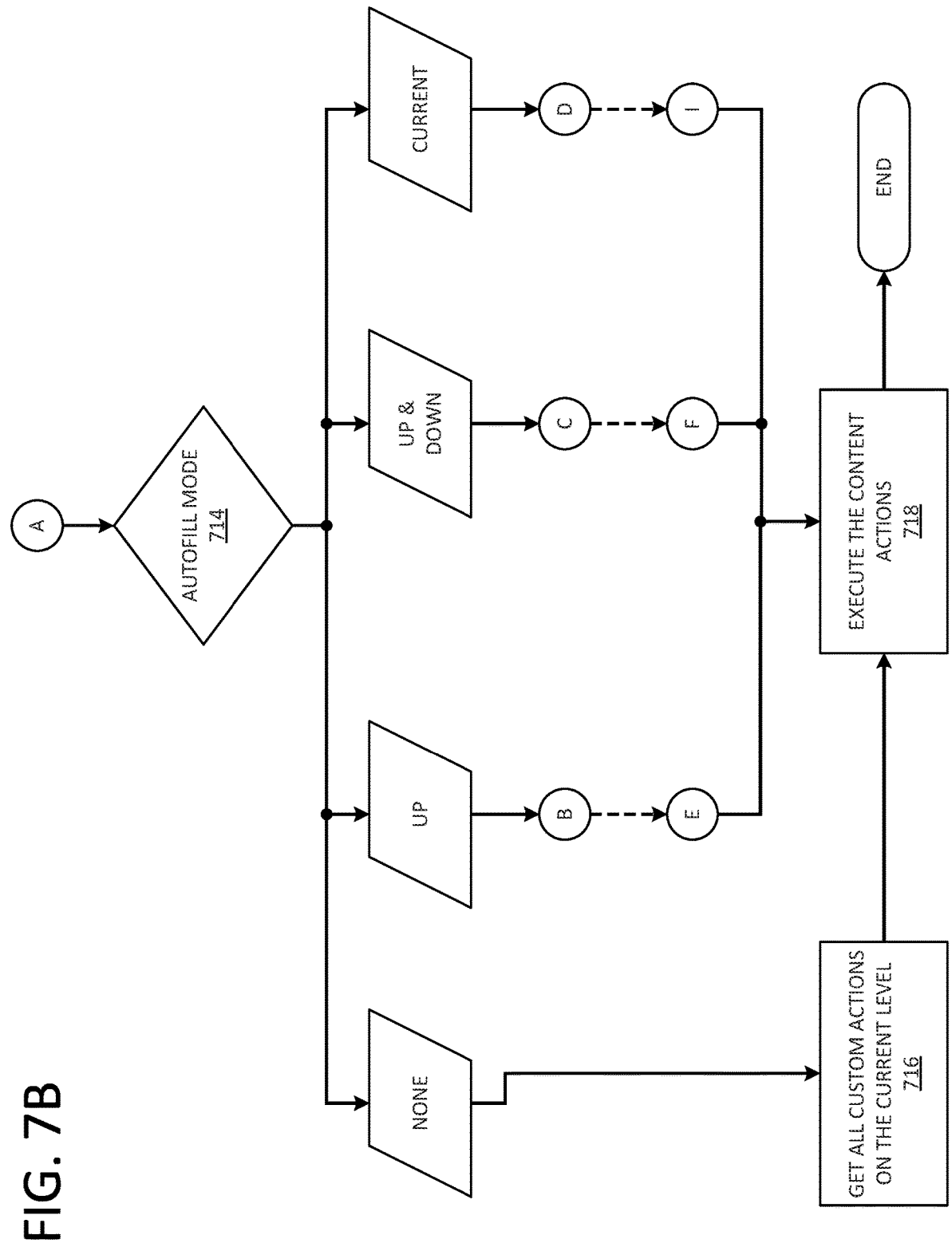

Referring to FIG. 7B, the auto-fill algorithm determines the auto-fill mode at step 714. When no auto-fill mode is selected, the auto-fill algorithm gets all custom actions on the current level (e.g., level of selected navigation item 302) at step 716 and executes the content actions at step 718 before ending. When the auto-fill mode is "up," "up and down," or "current" the auto-fill algorithm performs different processes that include common steps.

Figure 7C:
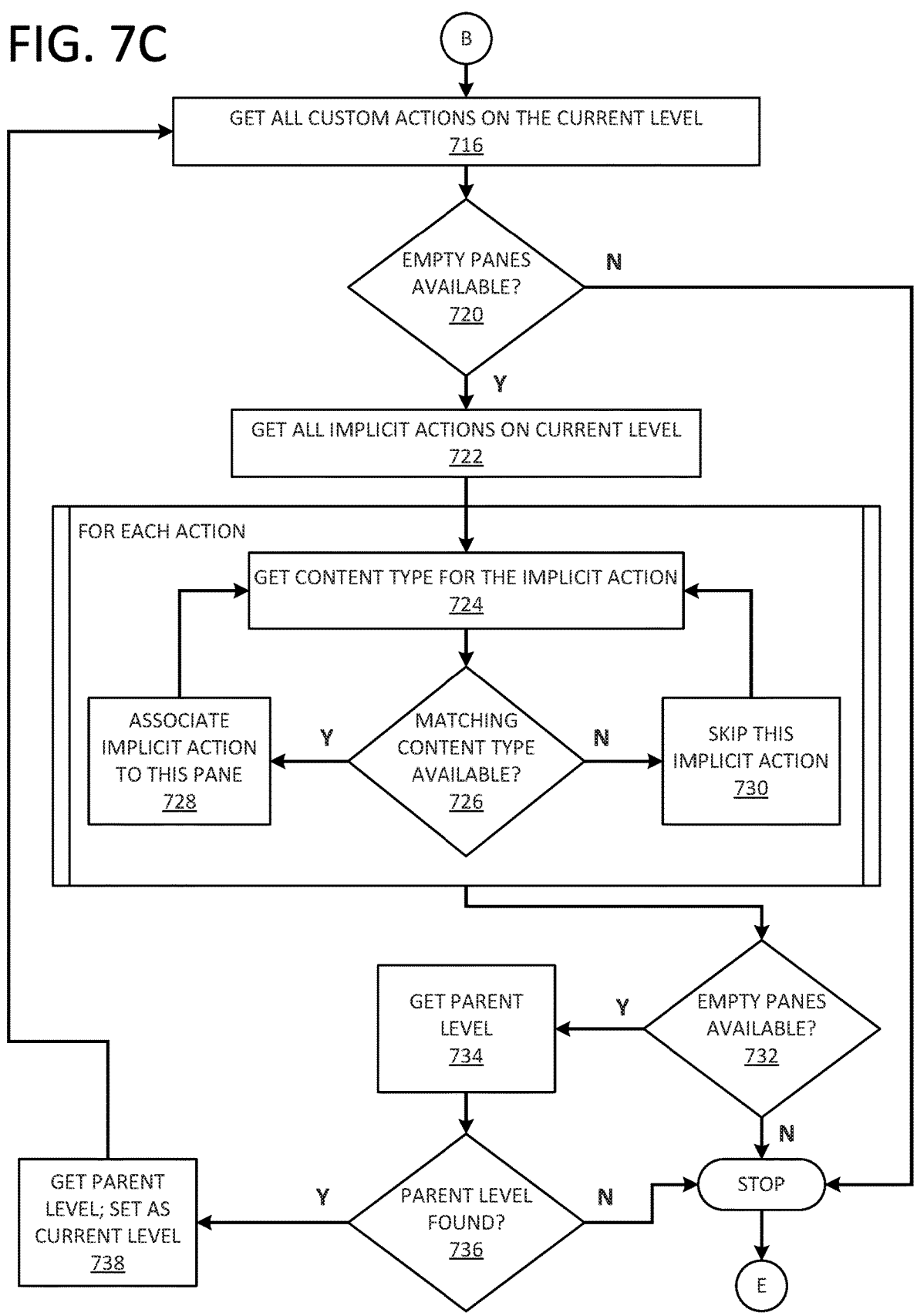

Referring to FIG. 7C, in which the auto-fill mode is "up," the algorithm gets all custom actions on the current level at step 716. At step 720, the algorithm determines whether any empty panes are available to fill with visual content. If no empty panes are available, the algorithm stops and executes the content actions at step 718 (FIG. 7B) before ending. When there are empty panes available, the algorithm gets all implicit actions on the current level at step 722. Then for each action, the algorithm performs a subprocess that includes steps 724, 726, 728, and 730. At step 724, the algorithm gets the content type for the current implicit action. The algorithm determines, at step 726, whether matching content type is available. When matching content type is available, the algorithm associates the implicit action to this pane at step 728. When matching content type is unavailable, the algorithm skips this implicit action as shown at step 730.

After completing the subprocess for each implicit action, the algorithm determines whether there are any empty panes available at step 732. When no panes are available, the algorithm stops and executes the content actions at step 718 before ending. When at least one empty pane is available, the algorithm attempts to get the parent level of the currently selected navigation item 302 at step 734. When the algorithm determines, at step 736, that no parent level can be found, the algorithm stops and executes the content actions at step 718 before ending. When a parent level is found the algorithm gets the parent level and sets it as the current level for which to process the actions at step 738 before continuing back to step 716.

Figure 7D:
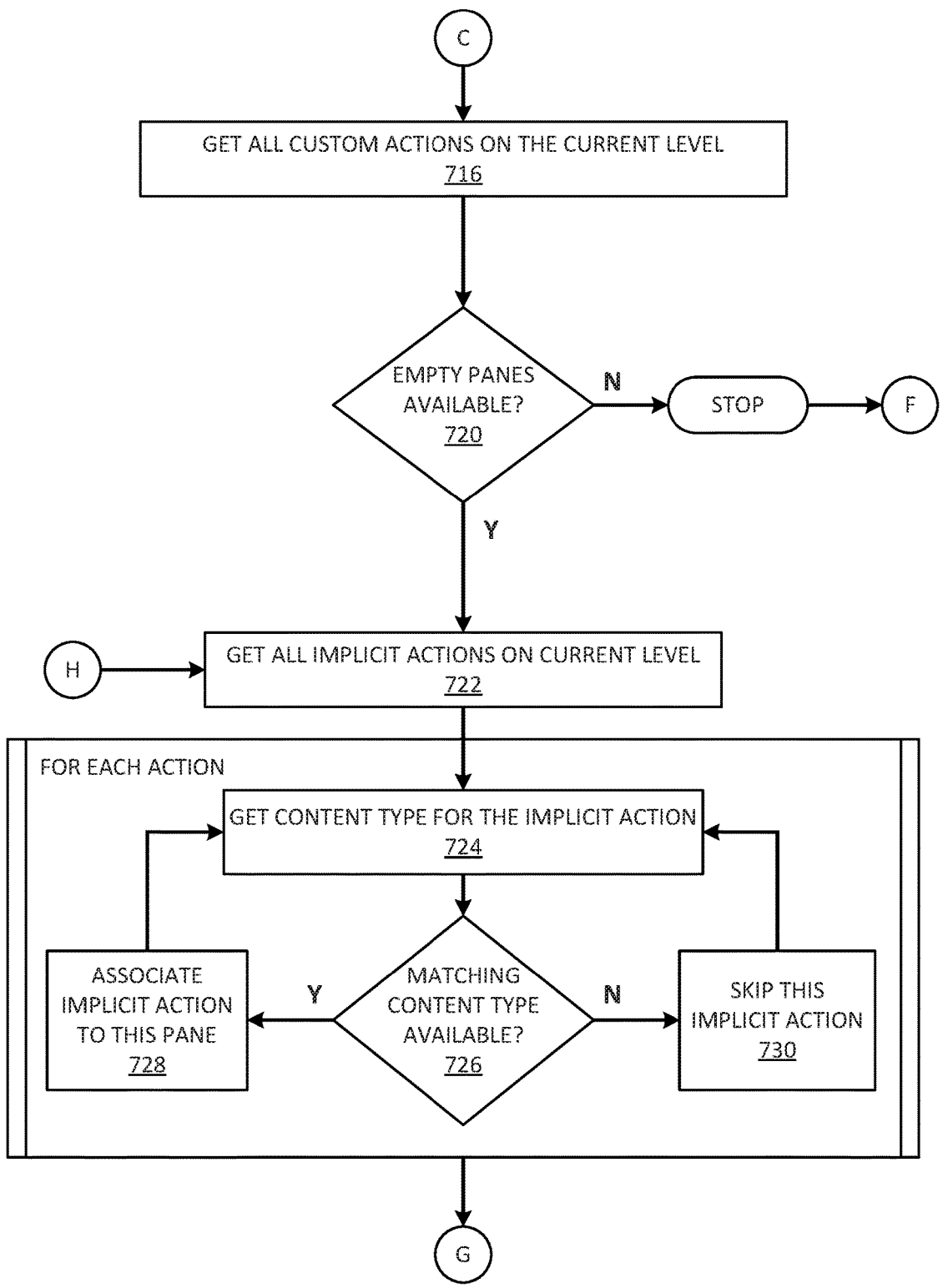
Figure 7E:
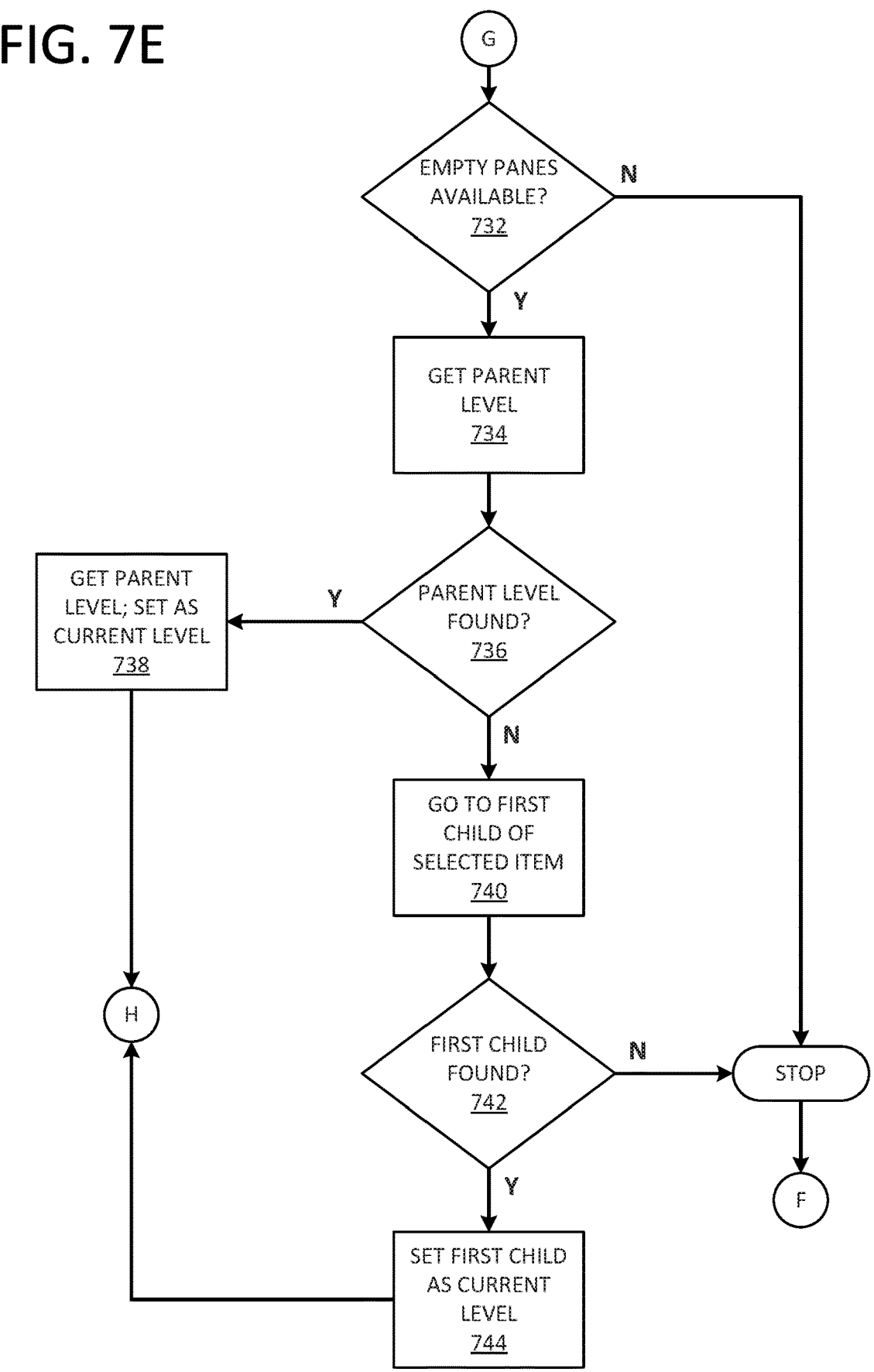

Referring to FIGS. 7D and 7E, in which the auto-fill mode is "up and down," the algorithm performs steps 716 and 720-736 as described above with respect to the "up" mode. But when the algorithm determines, at step 736, that a parent level is found the algorithm gets the parent level and sets it as the current level for which to process the actions at step 738 before continuing back to step 722. When no parent level can be found, the algorithm goes to the first child navigation item of the selected navigation item 302 within the navigation model 300 at step 740. When no first child navigation item is found at step 742, the algorithm stops and executes the content actions at step 718 before ending. When the first child navigation item is found at step 742, the algorithm sets the first child navigation item as the current level for which to process the actions at step 744 before continuing back to step 722.

Figure 7F:
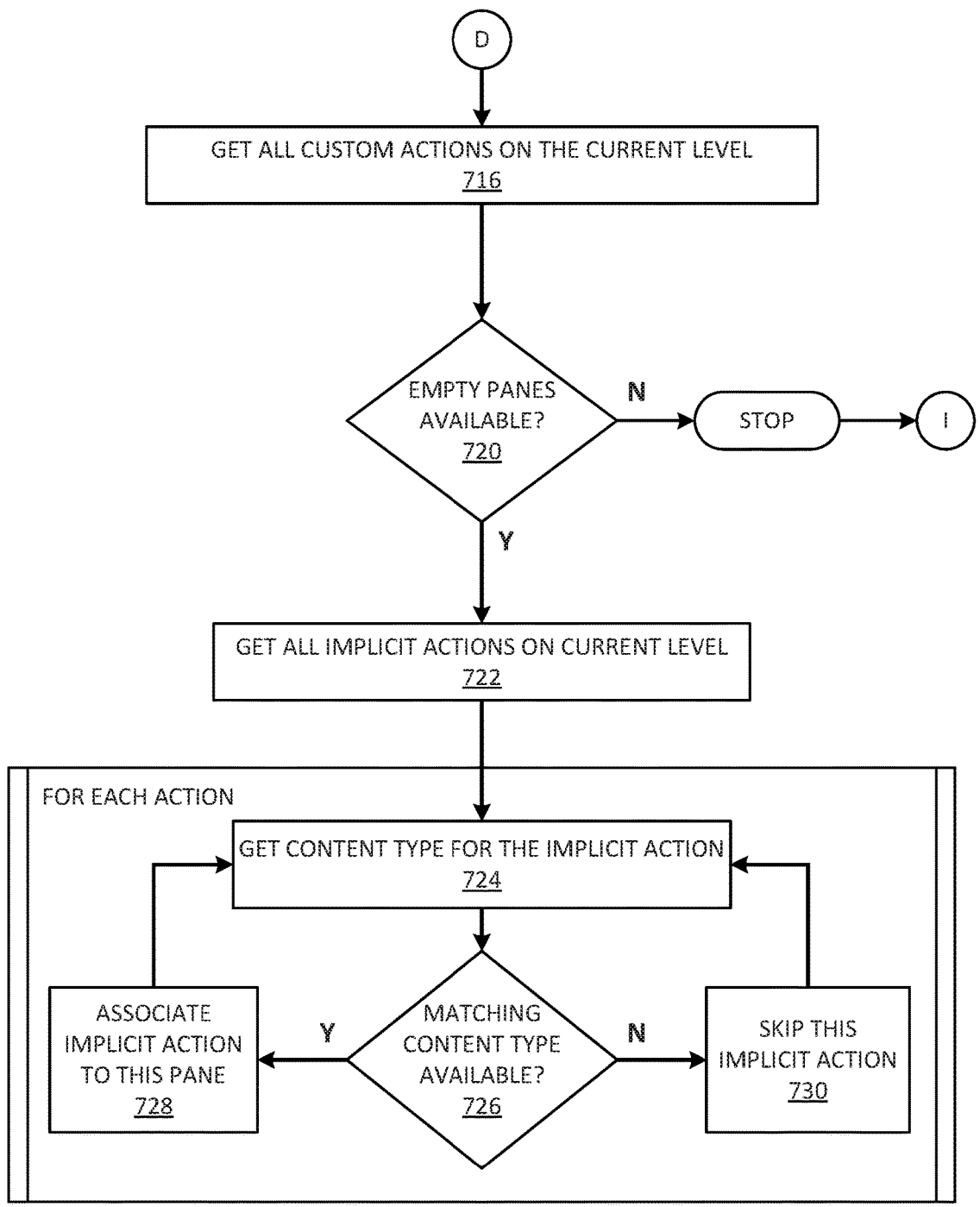

Referring to FIG. 7F, in which the auto-fill mode is "current," the algorithm performs steps 716 and 720-730 as described above with respect to the "up" mode.

As described herein, a ViewApp contains a navigation model that defines navigation of an HMI application. The navigation model defines navigation hierarchies, references to graphical components (e.g., visual content) within the hierarchy, and the actions (e.g., show visual content) to execute when a particular hierarchical item (e.g., navigation item) is selected by a user during design time and/or runtime. These behaviors are separated from the display of the navigation model, which allows the same navigation model to be displayed in multiple forms during runtime. When a user selects a navigation item (i.e., navigates) the computing device executing the processor-executable instructions automatically places associated graphical components (e.g., visual content) in appropriate locations (e.g., panes) on the screen based on the auto-fill algorithm. The auto-fill algorithm traverses the navigation model hierarchy to discover content with appropriate metadata (e.g., content type, etc.). Moreover, upon selection of a navigation item the computing device executing the processor-executable instructions sets context attributes that are utilized to update existing and newly added content.

In an exemplary embodiment, when a user selects a navigation item (e.g., asset) in the hierarchy of the navigation model the computing device executing the processor-executable instructions automatically places the content in each pane of a layout and updates the context so all of the panes in the layout display content representing data associated with the selected navigation item. For example, if a user selects a "Reactor West" navigation item the computing device executing the processor-executable instructions displays symbols and trends associated with "Reactor West" and an alarm display pane reacts to the context change and displays alarms from "Reactor West." In an embodiment in which the computing device includes multiple screens (e.g., multiple monitors) the computing device executing the processor-executable instructions automatically manages content placement across all screens.

In addition to the embodiment described above with respect to FIG. 2, embodiments of the present disclosure may comprise a special purpose computer including a variety of computer hardware, as described in greater detail below.

Embodiments within the scope of the present disclosure also include computer-readable media for carrying or having computer-executable instructions or data structures stored thereon. Such computer-readable media can be any available media that can be accessed by a special purpose computer. By way of example, and not limitation, computer-readable storage media include both volatile and nonvolatile, removable and non-removable media implemented in any method or technology for storage of information such as computer readable instructions, data structures, program modules or other data. Computer storage media are non-transitory and include, but are not limited to, random access memory (RAM), read only memory (ROM), electrically erasable programmable ROM (EEPROM), compact disk ROM (CD-ROM), digital versatile disks (DVD), or other optical disk storage, solid state drives (SSDs), magnetic cassettes, magnetic tape, magnetic disk storage, or other magnetic storage devices, or any other medium that can be used to carry or store desired program code means in the form of computer-executable instructions or data structures and that can be accessed by a general purpose or special purpose computer. When information is transferred or provided over a network or another communications connection (either hardwired, wireless, or a combination of hardwired or wireless) to a computer, the computer properly views the connection as a computer-readable medium. Thus, any such connection is properly termed a computer-readable medium. Combinations of the above should also be included within the scope of computer-readable media. Computer-executable instructions comprise, for example, instructions and data which cause a general purpose computer, special purpose computer, or special purpose processing device to perform a certain function or group of functions.

The following discussion is intended to provide a brief, general description of a suitable computing environment in which aspects of the disclosure may be implemented. Although not required, aspects of the disclosure will be described in the general context of computer-executable instructions, such as program modules, being executed by computers in network environments. Generally, program modules include routines, programs, objects, components, data structures, etc. that perform particular tasks or implement particular abstract data types. Computer-executable instructions, associated data structures, and program modules represent examples of the program code means for executing steps of the methods disclosed herein. The particular sequence of such executable instructions or associated data structures represent examples of corresponding acts for implementing the functions described in such steps.

Those skilled in the art will appreciate that aspects of the disclosure may be practiced in network computing environments with many types of computer system configurations, including personal computers, hand-held devices, multi-processor systems, microprocessor-based or programmable consumer electronics, network PCs, minicomputers, mainframe computers, and the like. Aspects of the disclosure may also be practiced in distributed computing environments where tasks are performed by local and remote processing devices that are linked (either by hardwired links, wireless links, or by a combination of hardwired or wireless links) through a communications network. In a distributed computing environment, program modules may be located in both local and remote memory storage devices.

An exemplary system for implementing aspects of the disclosure includes a special purpose computing device in the form of a conventional computer, including a processing unit, a system memory, and a system bus that couples various system components including the system memory to the processing unit. The system bus may be any of several types of bus structures including a memory bus or memory controller, a peripheral bus, and a local bus using any of a variety of bus architectures. The system memory includes nonvolatile and volatile memory types. A basic input/output system (BIOS), containing the basic routines that help transfer information between elements within the computer, such as during start-up, may be stored in ROM. Further, the computer may include any device (e.g., computer, laptop, tablet, PDA, cell phone, mobile phone, a smart television, and the like) that is capable of receiving or transmitting an IP address wirelessly to or from the internet.

The computer may also include a magnetic hard disk drive for reading from and writing to a magnetic hard disk, a magnetic disk drive for reading from or writing to a removable magnetic disk, and an optical disk drive for reading from or writing to removable optical disk such as a CD-ROM or other optical media. The magnetic hard disk drive, magnetic disk drive, and optical disk drive are connected to the system bus by a hard disk drive interface, a magnetic disk drive-interface, and an optical drive interface, respectively. The drives and their associated computer-readable media provide nonvolatile storage of computer-executable instructions, data structures, program modules, and other data for the computer. Although the exemplary environment described herein employs a magnetic hard disk, a removable magnetic disk, and a removable optical disk, other types of computer readable media for storing data can be used, including magnetic cassettes, flash memory cards, digital video disks, Bernoulli cartridges, RAMs, ROMs, SSDs, and the like.

Communication media typically embody computer readable instructions, data structures, program modules or other data in a modulated data signal such as a carrier wave or other transport mechanism and includes any information delivery media.

One or more aspects of the disclosure may be embodied in computer-executable instructions (i.e., software), routines, or functions stored in system memory or nonvolatile memory as application programs, program modules, and/or program data. The software may alternatively be stored remotely, such as on a remote computer with remote application programs. Generally, program modules include routines, programs, objects, components, data structures, etc. that perform particular tasks or implement particular abstract data types when executed by a processor in a computer or other device. The computer executable instructions may be stored on one or more tangible, non-transitory computer readable media (e.g., hard disk, optical disk, removable storage media, solid state memory, RAM, etc.) and executed by one or more processors or other devices. As will be appreciated by one of skill in the art, the functionality of the program modules may be combined or distributed as desired in various embodiments. In addition, the functionality may be embodied in whole or in part in firmware or hardware equivalents such as integrated circuits, application specific integrated circuits, field programmable gate arrays (FPGA), and the like.

The computer may operate in a networked environment using logical connections to one or more remote computers. The remote computers may each be another personal computer, a tablet, a PDA, a server, a router, a network PC, a peer device, or other common network node, and typically include many or all of the elements described above relative to the computer. The logical connections include a local area network (LAN) and a wide area network (WAN) that are presented here by way of example and not limitation. Such networking environments are commonplace in office-wide or enterprise-wide computer networks, intranets and the Internet.

When used in a LAN networking environment, the computer is connected to the local network through a network interface or adapter. When used in a WAN networking environment, the computer may include a modem, a wireless link, or other means for establishing communications over the wide area network, such as the Internet. The modem, which may be internal or external, is connected to the system bus via the serial port interface. In a networked environment, program modules depicted relative to the computer, or portions thereof, may be stored in the remote memory storage device. It will be appreciated that the network connections shown are exemplary and other means of establishing communications over wide area network may be used.

Preferably, computer-executable instructions are stored in a memory, such as the hard disk drive, and executed by the computer. Advantageously, the computer processor has the capability to perform all operations (e.g., execute computer-executable instructions) in real-time.

The order of execution or performance of the operations in embodiments illustrated and described herein is not essential, unless otherwise specified. That is, the operations may be performed in any order, unless otherwise specified, and embodiments may include additional or fewer operations than those disclosed herein. For example, it is contemplated that executing or performing a particular operation before, contemporaneously with, or after another operation is within the scope of aspects of the disclosure.

Embodiments may be implemented with computer-executable instructions. The computer-executable instructions may be organized into one or more computer-executable components or modules. Aspects of the disclosure may be implemented with any number and organization of such components or modules. For example, aspects of the disclosure are not limited to the specific computer-executable instructions or the specific components or modules illustrated in the figures and described herein. Other embodiments may include different computer-executable instructions or components having more or less functionality than illustrated and described herein.

When introducing elements of aspects of the disclosure or the embodiments thereof, the articles "a", "an", "the" and "said" are intended to mean that there are one or more of the elements. The terms "comprising", "including", and "having" are intended to be inclusive and mean that there may be additional elements other than the listed elements.

Having described aspects of the disclosure in detail, it will be apparent that modifications and variations are possible without departing from the scope of aspects of the disclosure as defined in the appended claims. As various changes could be made in the above constructions, products, and methods without departing from the scope of aspects of the disclosure, it is intended that all matter contained in the above description and shown in the accompanying drawings shall be interpreted as illustrative and not in a limiting sense.

What is claimed is:

1. A hierarchical display system for automated graphical user interface configuration comprising:
   a processor and a non-transitory computer readable medium;
   the non-transitory computer readable medium comprising computer executable instructions for creating:
      a navigational model;
      a plurality of navigational items;
      a GUI profile;
      one or more GUIs; and
      a plurality of layouts;
      wherein the navigational model comprises a multi-level hierarchy comprising the plurality of navigational items;
      wherein each of the navigational items is one of a current node, a parent node, or a child node within the multi-level hierarchy;
      wherein the current node comprises a current navigational item configured for selection by a user, the parent node comprises a parent navigational item in the multi-level hierarchy, and the child node comprises a child navigational item in the multi-level hierarchy;
      wherein each of the plurality of navigational items comprises a GUI profile, the GUI profile representing the one or more GUIs within a runtime environment, the GUI profile configured and arranged to allow a user to assign a layout selection of one of the plurality of layouts to each of the one or more GUIs;
      the executable instructions configured and arranged to cause the processor to:
         determine the number of GUIs present in the runtime environment;
         query the current node to determine a number of GUIs specified by a current GUI profile;
         apply the layout selection from the current GUI profile to each of the specified GUIs;
         wherein when the number of number GUIs specified by the GUI profile is less than the number of GUIs present in the runtime environment, the instructions are further configured and arranged to:
            query one of the parent node or child node to determine if a parent GUI profile or child GUI profile specifies a layout selection for one or more of the remaining GUIs; and
            apply the layout selection from the parent GUI profile or the child GUI profile to one or more of the remaining GUIs.

2. The hierarchical display system of claim 1,
   wherein each layout selection comprises one or more panes;
   wherein each of the one or more panes comprise a pre-existing content pane and/or a content type pane;
   the computer executable instructions further configured and arranged to cause the processor to:
      display the pre-existing content of the layout selection for a given node in a pre-existing content GUI pane;
      or, for panes that do not have pre-existing content,
      determine a content to display in one or more content type GUI panes based on a content type.

3. The hierarchical display system of claim 2,
   wherein to determine a content to display, the computer executable instructions are further configured and arranged to cause the processor to:
      query the current node to determine the content type for each pane of the current layout selection;
      apply content from a pane in the current node that matches the content type into an available content type GUI pane;
      wherein when one or more pane in the current node does not have a matching content type, the instructions are further configured and arranged to cause the processor to:
         query the parent and/or child node to determine a content type for each pane of the parent and/or child layout selection;
         apply content from a pane in the parent and/or child node that matches the content type into an available content type GUI pane.

4. The hierarchical display system of claim 3,
   wherein if the content type pane is a multiple content type pane configured to host multiple content, the computer executable instructions are further configured and arranged to cause the processor to:
      apply content from a pane in the current node that matches the content type content type into the multiple content type pane;
      query the parent and/or child node to determine a content type for each pane of the parent and/or child layout selection;
      apply content from a pane in the parent and/or child node that matches the content type into the multiple content type pane; and
      continue the query until the multiple content type pane is full.

5. The hierarchical display system of claim 3,
   where querying the parent and/or child node comprises using a path string that describes the multi-level hierarchy.

6. The hierarchical display system of claim 3,
further comprising one or more hierarchy aware controls,
wherein each hierarchy aware control controls how many current, parent and/or child nodes to display in the runtime environment.

7. The hierarchical display system of claim 6,
wherein each of the one or more hierarchy aware controls can be linked together to provide advanced behaviors in the runtime environment.

8. The hierarchical display system of claim 7,
wherein achieving advanced behaviors comprises one or more nodes in the second hierarchy aware control to be accessed by the first hierarchy aware control.

9. A hierarchical display system for automated graphical user interface configuration comprising:
  a processor and a non-transitory computer readable medium, the non-transitory computer readable medium comprising instruction configured and arranged to cause the processor to:
    generate a plurality of GUIs in a runtime environment, at least one of the plurality of GUIs comprising a navigational model comprising a hierarchy of navigational items, each navigational item located in one level of a plurality of levels of the hierarchy;
    accept a user selection of one of the of the navigational items, where the user selected navigational item is a current navigational item;
    determine a number of GUIs specified by a GUI profile associated with the current navigational item;
    determine a layout for each of the number of GUIs as specified by the GUI profile;
    display the layout in each of the number of GUIs as specified by the GUI profile;
    determine if the number GUIs as specified by the GUI profile is less than the number of available GUIs;
    query one or more levels of the hierarchy to determine if a GUI profile associated with the respective level has a layout specified for one or more of the remaining GUIs;
    apply the layout from the level to the corresponding GUI;
    repeat the query until all of the number of GUIs have layouts applied or until all levels have been queried.

10. The hierarchical display system of claim 9,
wherein each layout contains one or more panes;
wherein the content displayed in the one or more panes are controlled by an auto-fill pane algorithm;
wherein the auto-fill pane algorithm executes according to a fill mode.

11. The hierarchical display system of claim 10,
wherein a fill mode is a fill from current mode;
wherein a fill from current mode comprises filling the one or more panes with only content from a navigational item selected by the user.

12. The hierarchical display system of claim 10,
wherein a fill mode is a fill from current and look up mode;
wherein is a fill from current and look up mode comprises:
  filling the one or more panes with content a navigational item selected by the user;
  for any panes that are still empty, querying the next higher level of the hierarch for additional commands or content to apply to the empty panes;
  applying the content to the panes;
  continuing to the next higher level of the hierarchy and applying a content until all panes are filled or the root of navigation model is reached.

13. The hierarchical display system of claim 10,
wherein a fill mode is a fill from current and look up then down mode;
wherein is a fill from current and look up mode comprises:
  filling the one or more panes with content a navigational item selected by the user;
  for any panes that are still empty, querying the next higher level of the hierarch for additional commands or content to apply to the empty panes;
  applying the content to the panes;
  continuing to the next higher level of the hierarchy and applying a content until all panes are filled or the root of navigation model is reached;
  if the root is reached and any of the one or more panes remain empty, querying the next lower level of the hierarch for additional commands or content to apply to the empty panes;
  applying the content to the panes; and
  continuing to the next lower level of the hierarchy and applying a content from that level until all panes are filled or a leaf of navigation model is reached.

14. The hierarchical display system of claim 10,
wherein the auto-fill pane algorithm uses explicit actions to determine how to fill panes;
wherein explicit actions force the content of a pane within the layout to be displayed on a corresponding pane of a target GUI;
wherein explicit actions are triggered by the presence of a pane name on a GUI for placement;
wherein regardless of what layout is applied the GUI, the auto-fill pane algorithm will use an explicit action on any level of the navigation model if a pane name specified in the layout is present on a target GUI and the pane is available to receive the content.

15. The hierarchical display system of claim 10,
wherein the auto-fill pane algorithm uses implicit actions to determine how to fill panes;
wherein implicit actions allow a content type of a pane within the layout to be assigned to a corresponding pane of a target GUI;
wherein the auto-fill pane algorithm will use an implicit action to use a content on any level of the navigation model to fill a pane if the content type of the content on any level matches the content type of the target GUI.

16. The hierarchical display system of claim 10,
wherein the fill mode queries the current navigational item and fills the panes of a target GUI with content from the current navigational item that matches a content name or a content type.

17. A hierarchical display method for automated graphical user interface configuration comprising:
  providing a processor and a non-transitory computer readable medium;
  the non-transitory computer readable medium comprising computer executable instructions for creating:
    a navigational model;
    a plurality of navigational items;
    a GUI profile;
    one or more GUIs; and
    a plurality of layouts;
    wherein the navigational model comprises a multi-level hierarchy comprising the plurality of navigational items;
    wherein each of the navigational items is one of a current node, a parent node, or a child node within the multi-level hierarchy;

wherein the current node comprises a current navigational item configured for selection by a user, the parent node comprises a parent navigational item in the multi-level hierarchy, and the child node comprises a child navigational item in with the multi-level hierarchy;

wherein each of the plurality of navigational items comprises a GUI profile, the GUI profile representing the one or more GUIs within the runtime environment, the GUI profile configured and arranged to allow a user to assign a layout selection of one of the plurality of layouts to each of the one or more GUIs;

the executable instructions configured and arranged to cause the processor to execute the method steps of:

determining the number of GUIs present in the runtime environment;

querying the current node to determine a number GUIs specified by a current GUI profile;

applying the layout selection from the current GUI profile to each of the specified GUIs;

wherein when the number of number GUIs specified by the GUI profile is less than the number of GUIs present in the runtime environment, the instructions are further configured and arranged to execute the method steps of:

querying one of the parent node or child node to determine if a parent GUI profile or child GUI profile specifies a layout selection for one or more of the remaining GUIs; and applying the layout selection from the parent GUI profile or the child GUI profile to one or more of the remaining GUIs.

18. The hierarchical display method of claim 17, wherein each layout selection comprises one or more panes;

wherein each of the one or more panes comprise a pre-existing content pane and/or a content type pane;

the computer executable instructions further configured and arranged to cause the processor to execute the method steps of:

displaying the pre-existing content of the layout selection for a given node in a pre-existing content GUI pane;

or, for panes that do not have pre-existing content, determining a content to display in one or more content type GUI panes.

19. The hierarchical display system of claim 18, wherein to determine a content to display, the computer executable instructions are further configured and arranged to cause the processor to execute the method steps of:

querying the current node to determine a content type for each pane of the current layout selection;

applying content from a pane in the current node that matches the content type into an available content type GUI pane;

wherein when one or more pane in the current node does not have a matching content type, the instructions are further configured and arranged to cause the processor to:

query the parent and/or child node to determine a content type for each pane of the parent and/or child layout selection;

apply content from a pane in the parent and/or child node that matches the content type into an available content type GUI pane.

20. The hierarchical display system of claim 19, wherein if the content type pane is a multiple content type pane configured to host multiple content, and the current node only has a single content type pane, the computer executable instructions are further configured and arranged to cause the processor to execute the method steps of:

querying the current, parent and/or child node to determine a content type for each pane of the parent and/or child layout selection;

applying content from a pane in the parent and/or child node that matches the content type into the multiple content type pane;

continuing the query until the multiple content type pane is full.

* * * * *